US005538387A

United States Patent [19]

[11] Patent Number: 5,538,387

Durivage et al.

[45] Date of Patent: Jul. 23, 1996

[54] PALLET ASSEMBLY FOR A VEHICLE

[75] Inventors: Joseph G. J. Durivage, St-Sabastien; Joseph B. C. Chouinard, Lacolle; Ernest R. Vaillancourt, St-Jean-Sur-Richelieu; Alan C. Russell, St-Luc, all of Canada

[73] Assignee: WCA Canada Inc., Quebec

[21] Appl. No.: 373,762

[22] Filed: Jan. 17, 1995

[51] Int. Cl.$^6$ .......................... B60P 1/00

[52] U.S. Cl. .......................... 414/495; 414/608; 414/392; 414/399; 414/343; 108/52.1; 296/183

[58] Field of Search .......................... 296/1.1, 181, 182, 296/183, 193; 414/608, 343, 340, 347, 345, 471, 495, 525.9, 535, 539, 540, 607, 391, 392, 397, 498; 108/106, 107, 144, 52.1; 193/35, 55, 41; 244/117 R, 118.1; 105/404, 355; 248/912, 916, 669; 410/46; 254/930, 93 VA, 124, 8 R

[56] References Cited

U.S. PATENT DOCUMENTS

| | | |
|---|---|---|
| 2,606,508 | 8/1952 | Van Nes . |
| 3,151,754 | 10/1964 | Kemp . |
| 3,362,552 | 1/1968 | Thiele . |
| 3,404,791 | 10/1968 | Larson . |
| 3,904,053 | 9/1975 | Yatagai et al. . |
| 4,013,017 | 3/1977 | Tlyota et al. . |
| 5,082,415 | 1/1992 | Hayashi . |

FOREIGN PATENT DOCUMENTS

| | | | |
|---|---|---|---|
| 760292 | 6/1967 | Canada . | |
| 2013980 | 10/1990 | Canada . | |
| 101107 | 10/1962 | Denmark | 193/35 SS |
| 568910 | 11/1975 | Switzerland | 414/608 |

*Primary Examiner*—Frank E. Werner
*Attorney, Agent, or Firm*—George A. Seaby

[57] ABSTRACT

Flat, flexible articles such as carpets are commonly transported on wooden pallets, which are prone to breakage, and which must be returned for re-use after the articles have been delivered to their destination. A simple solution to the problem is to provide a pallet assembly which forms the floor of a truck or tailer, and which includes a casing, a cover on the casing with a load supporting surface, a plurality of support bars vertical slidable in the cover for movement between a lower position substantially flush with the load supporting surface of the cover and an elevated position in which the load is supported by the support bars only, and a drive mechanism at each end of the support bars for simultaneously moving all of the support bars between the lower position and the elevated position. In the elevated position, the forks of a forklift truck can be inserted between the support bars for transferring a load to such bars or for removing a load therefrom. A load on the support bars is lowered using the drive mechanism, so that the load is supported by both the bars and the top surface of the cover.

7 Claims, 8 Drawing Sheets

PALLET ASSEMBLY FOR A VEHICLE

BACKGROUND OF THE INVENTION

1. Field of the Invention

This invention relates to a pallet assembly and in particular to a pallet assembly for use in a truck, trailer or other vehicle.

2. Discussion of the Prior Art

When shipping large quantities of flat articles such as carpets for home or automotive use, the usual practice is to load the carpets onto wooden pallets in a factory, and to place the pallets with their loads in a truck or trailer for transport to their destination. The pallets must then be returned to the factory for re-use. Wooden pallets are expensive to produce and are often damaged during use. Moreover, the use of wooden pallets involves the additional expense of returning the pallets to the carpet factory. Accordingly, it is readily apparent that a need exists for a solution to these problems, i.e. there is a need for a shipping device to be used with flat articles which is not separate from the vehicle used to transport the articles from place to place.

A search of the patent literature discloses examples of devices which, at least in theory, could be used to obviate the need for separate pallets when shipping flat articles. Devices of the type in question are disclosed, for example by Canadian Patent No. 760,292 issued to A. M. Hand on Jun. 6, 1967, and laid open application Ser. No. 2,013,980, filed by C. Gianguido on Oct. 14, 1990, and U.S. Pat. No. 2,606,508, issued to N. J. Van Nes on Aug. 12, 1952; U.S. Pat. No. 3,151,754, issued to J. H. Kemp on Oct. 6, 1964; U.S. Pat. No. 3,362,552, issued to G. E. Thiele on Jan. 1, 1968; U.S. Pat. No. 3,404,791, issued to C. L. R. Larson on Oct. 8, 1968; U.S. Pat. No. 3,904,053, issued to S. Yatagai et al on Sep. 9, 1975; U.S. Pat. No. 4,013,017, issued to H. Tlyota et al on Mar. 22, 1977 and U.S. Pat. No. 5,082,415, issued to T. Hayashi on Jan. 21, 1992. Some of the patented apparatuses are ill adapted for use on trucks as a truck bed, while others of the apparatus are somewhat complicated in terms of both structure and operation.

GENERAL DESCRIPTION OF THE INVENTION

The object of the present invention is to meet the above defined need by providing a relative simple pallet assembly which can be used as the floor of a truck or trailer, eliminating the use of separate pallets for shipping flat articles.

Accordingly, the present invention relates to a pallet assembly for a vehicle comprising casing means, cover means on said casing means having a load supporting surface; a plurality of support bar means slidable in said cover means for movement between a lower position substantially flush with said load supporting surface and an elevated position in which the load is supported by said support bar means; and elevating means for simultaneously moving all said support bar means between said lower position in which any load is supported simultaneously by said cover means and said support bar means, and the elevated position in which the load is supported by said support bar means only.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENT

Figure 1:
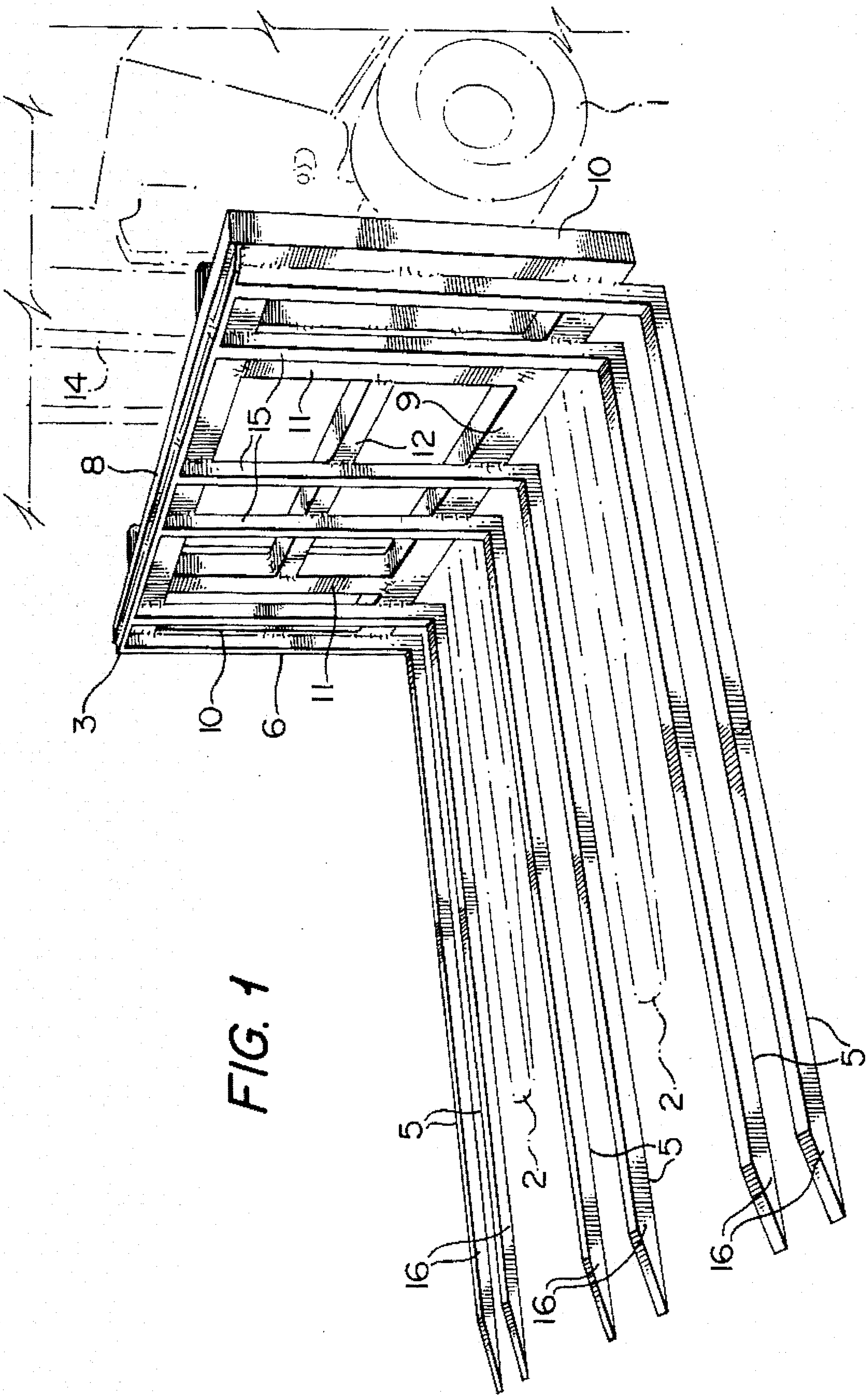
FIG. 1 is a perspective view of the front end of a forklift truck adapted for use with the pallet assembly of the present invention.

With reference to FIG. 1, the pallet assembly of the present invention is intended for use with a forklift truck 1, which includes conventional forks 2 and an additional fork assembly 3 mounted on the front end of the truck 1. The fork assembly 3 is designed to provide additional forks 5 for lifting loads from the pallet assembly of the present invention. The fork assembly 3 includes a rectangular frame 6 defined by top bar 8, bottom bar 9, end bars 10, crossbars 11 extending between the top and bottom bars 8 and 9, and central reinforcing bar 12 extending longitudinally of the frame. The frame 6 is mounted on the carriage (not shown) of the truck 1 for vertical movement on the mast 14 thereof. The vertical arms 15 of a plurality of the L-shaped forks 6 are welded to the front of the frame 6 with the horizontal arms 16 of the forks extending outwardly from the frame parallel to the forks 2.

Figure 2:
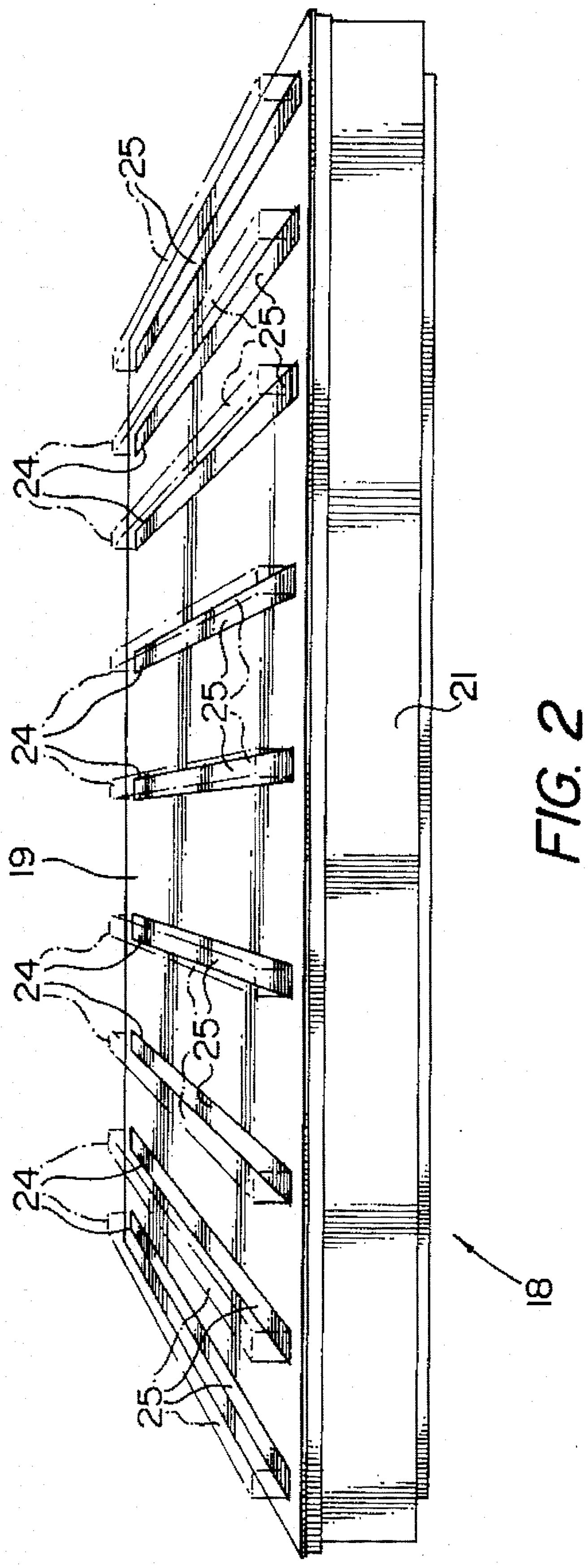
FIG. 2 is a perspective view of a pallet assembly in accordance with the present invention.

As mentioned above, the pallet assembly is intended to define the floor of a vehicle such as a truck or trailer (not shown) so that separate pallets are not required for shipping flat articles such as carpets or the like. The pallet assembly includes a rectangular casing generally indicated at 18. The casing 18 is defined by a top wall 19, a bottom wall 20, side walls 21 and end walls 22. The top wall 19 is mounted on ledges 23 extending inwardly from the side walls 21. A plurality of square cross section, load supporting bars 24 are mounted in the casing 18 for movement between a lower position (shown in solid lines in FIG. 2) and an elevated position (shown in phantom outline in FIG. 2). In the lower position, the top surface 25 of the bars are flush with the top or outer surface of the top wall 19 of the casing 18. In such lower position, a load of carpets or other flat articles (not shown) is supported by the top wall 19 and by the bars 24.

Figure 3:
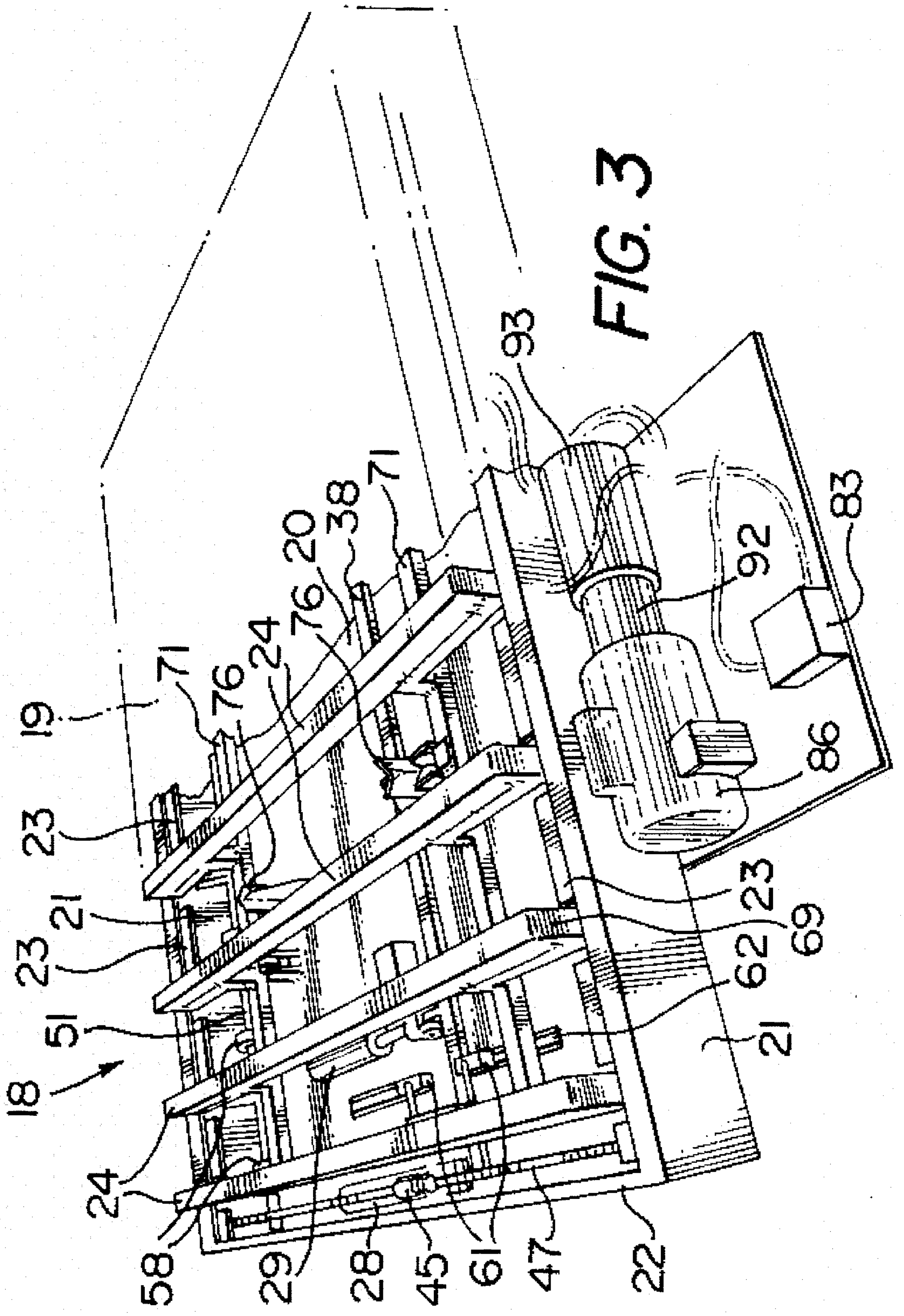
FIG. 3 is a perspective view of the interior of one-half of the pallet assembly of FIG. 2.
Figure 4:
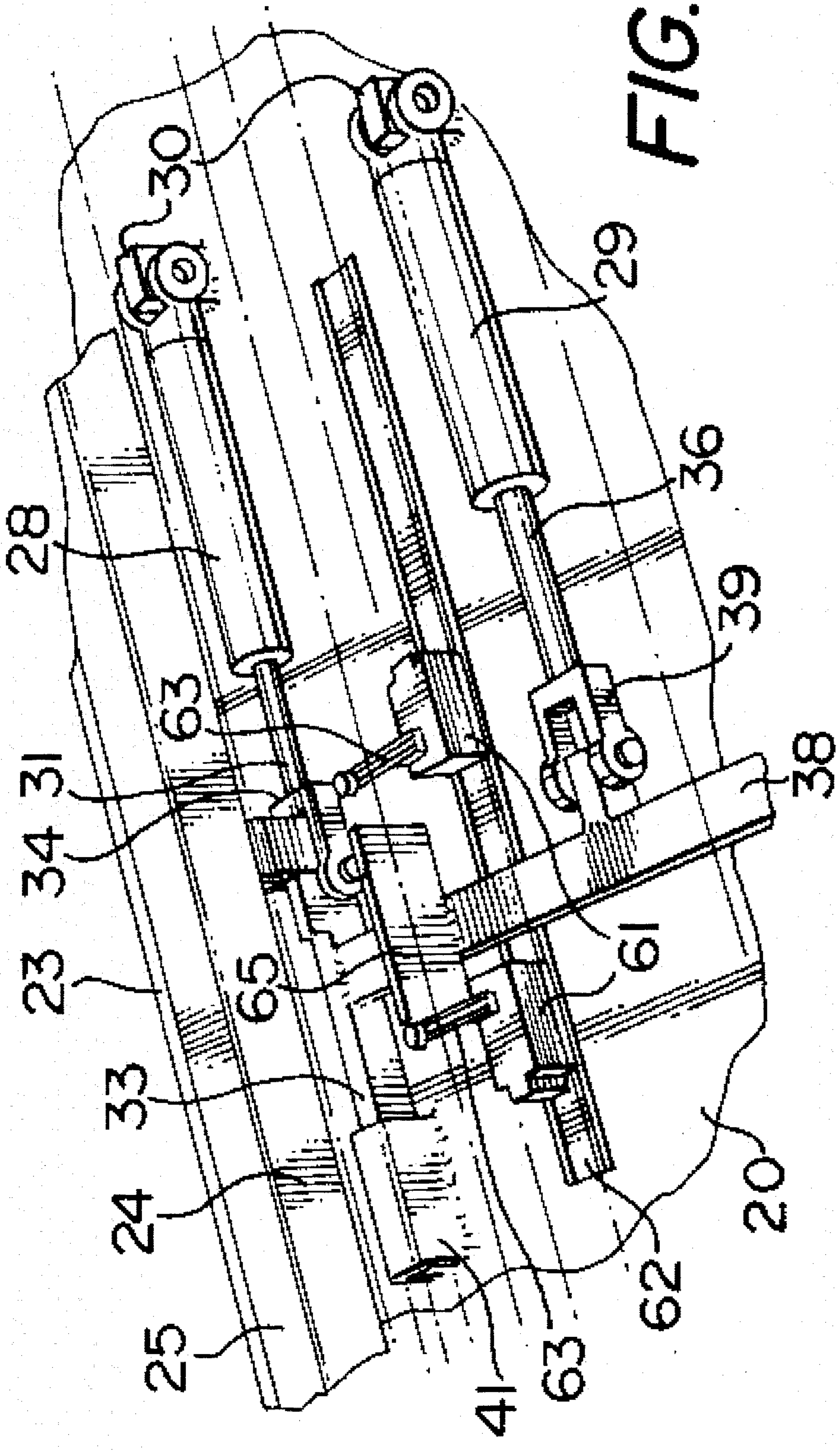
FIG. 4 is a perspective view of a portion of a drive mechanism used in the apparatus of FIGS. 2 and 3, with parts omitted.
Figure 5:
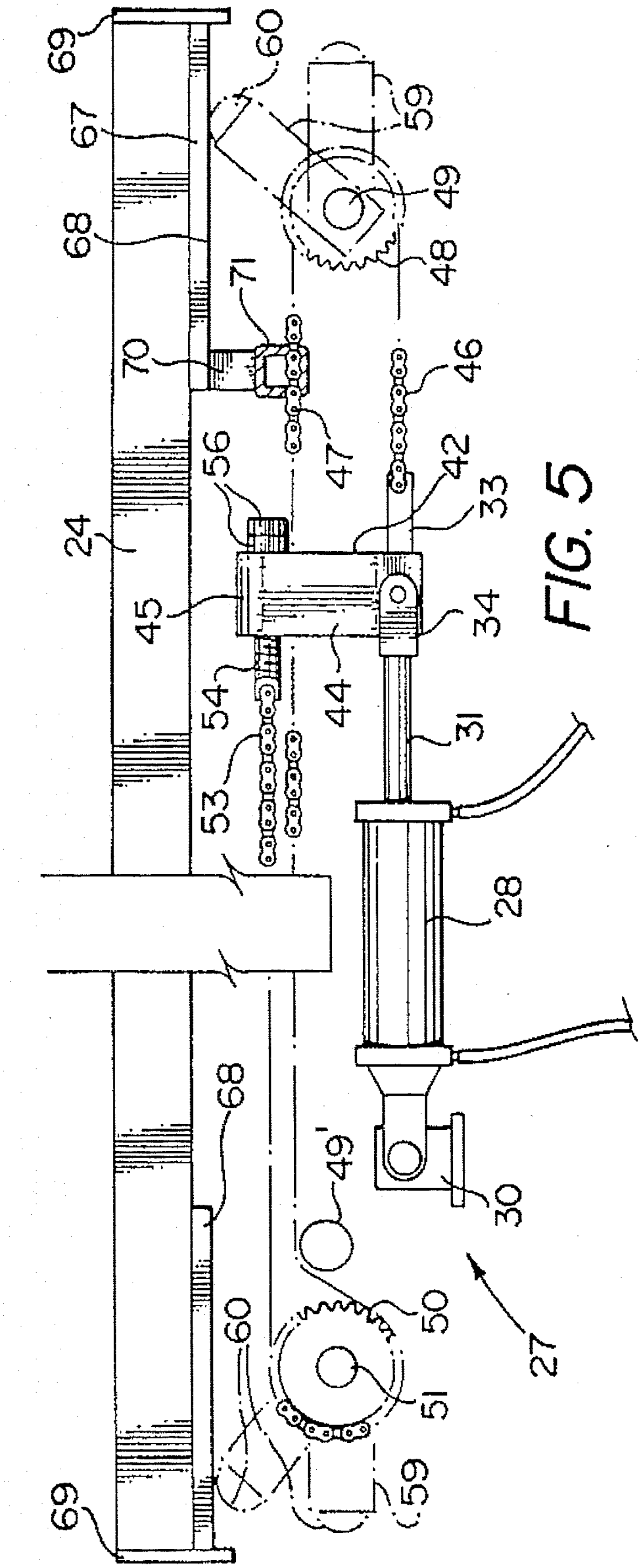
FIG. 5 is a schematic, partly sectioned side view of the drive mechanism.
Figure 6:
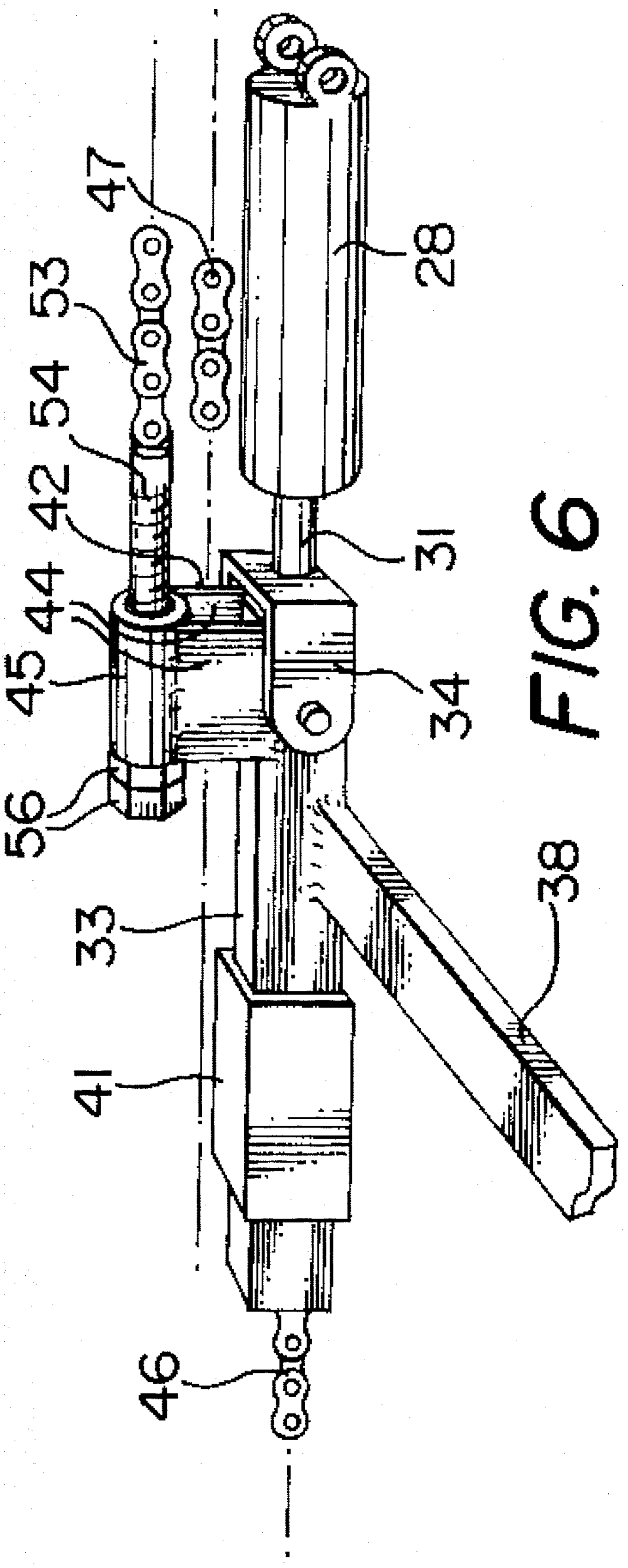
FIG. 6 is a perspective view of a slide used in the drive mechanism of FIG. 5.

When the load is to be removed from the top of the pallet assembly, it is necessary to raise the bars 24 so that the forks 2 and 5 can be inserted between the bars 24, i.e. beneath the load. Referring to FIG. 5, the bars 24 are raised using hydraulic drive mechanisms (one shown) generally indicated at 27. A similar drive mechanism 27 is provided at each end of the casing 18, the contents of the casing on each side of the center thereof being the same. Accordingly one drive mechanism is described in detail. As illustrated in FIGS. 3 to 5 , each drive mechanism 27 includes a pair of hydraulic cylinders 28 and 29 pivotally mounted on posts 30 on the bottom wall 21 of the casing 18. A piston rod 31 extending out of the cylinder 28 closest to an end wall 22 of the casing 18 is connected to a slide 33 by a clevis 34. The piston rod 36 extending out of the other cylinder 29 is connected to a crossbar 38 by a clevis 39. The crossbar 38 extends from the slide 33 the length of the casing 18 to the slide (not shown) of the other drive mechanism. The slide 33 is mounted for longitudinal movement in a track 41 defined by a length of square cross section pipe welded to the bottom wall 20 of the casing 18. The slide 33 is generally L-shaped, including a vertical arm 42 defined by a pair of parallel spaced apart plates 44 with a sleeve 45 defined by a short length of pipe welded to the top end thereof. One end 46 of a chain 47 is connected to the outer free end of the slide 33. The chain 47 passes around a toothed wheel 48 on one end of a shaft 49 extending the length of the casing, with a similar toothed wheel (not shown) on the other end thereof. After passing around the toothed wheel 48 the chain returns through the hollow vertical arm 42 of the slide, around a wheel 49' at the other end of the casing 18 to another toothed wheel 50. The wheel 50 is mounted on one end of a second shaft 51 extending the length of the casing 18 with another toothed wheel (not shown) on the other end of the shaft. The chain 47 then passes around the toothed wheel 50 and returns to the top of the vertical arm 42 of the slide 33. The other end 53 of the chain 47 is connected to one end of a bolt 54 which extends through the sleeve 45, and is retained therein by nuts 56. The nuts 56 make it possible to adjust the effective length and the tension on the chain 47.

Figure 8:
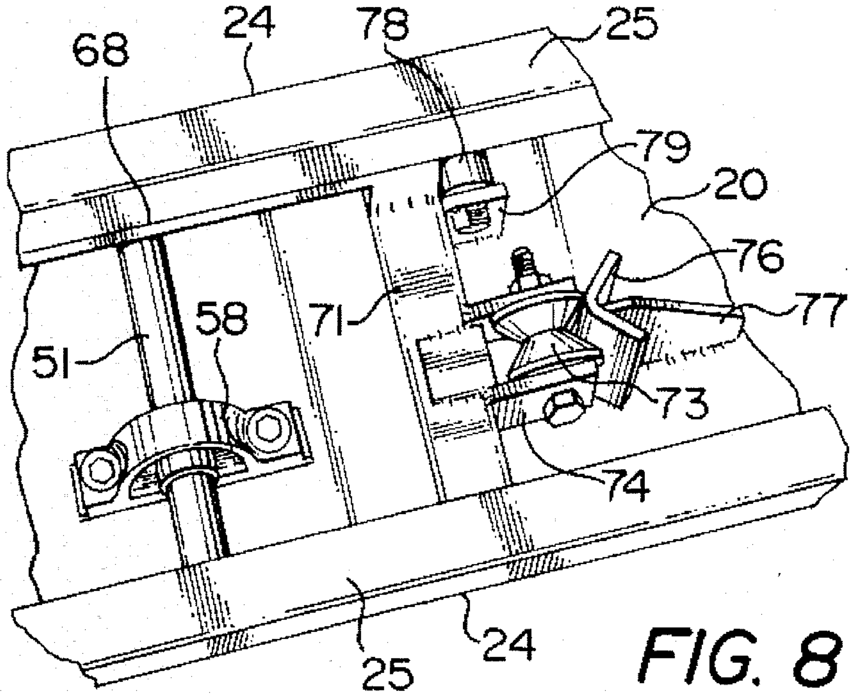
FIG. 8 is a perspective view of a bearing and a guide rail used in the pallet assembly of FIG. 2.
Figure 9:
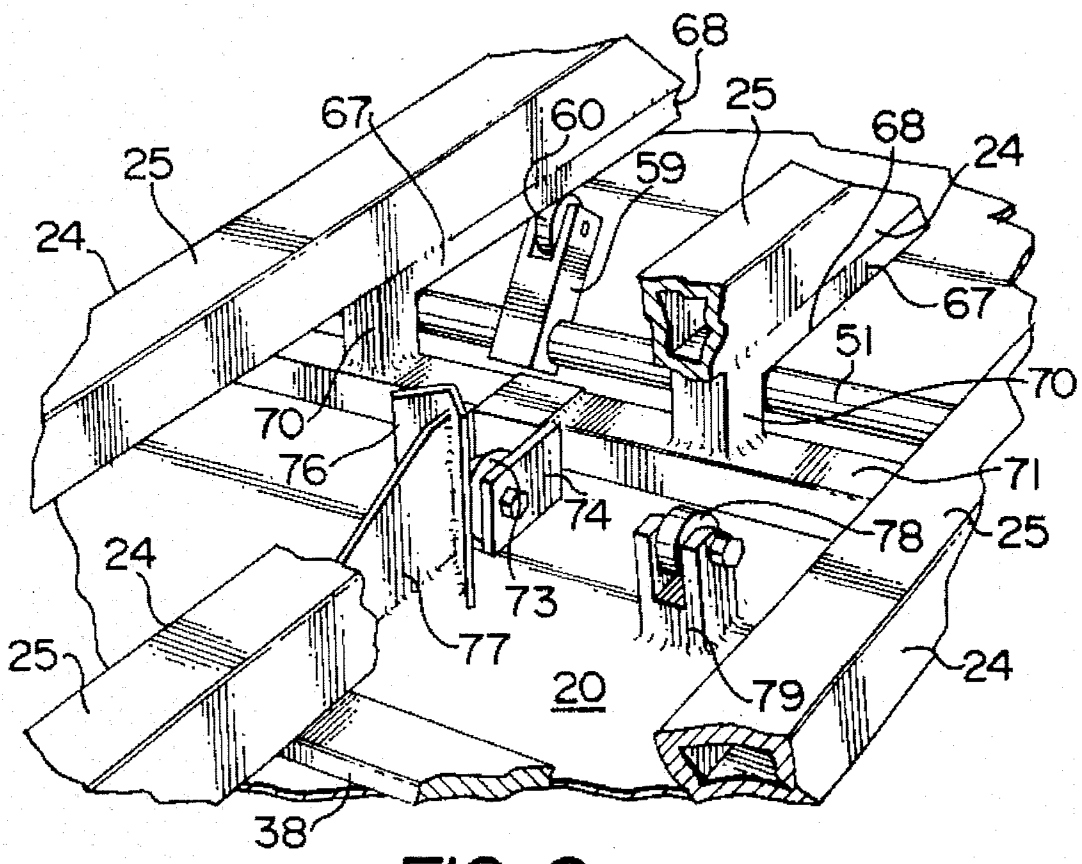
FIG. 9 is a partly sectioned, perspective view of guide elements of the drive assembly of FIG. 5.

The shafts 49 and 51 are rotatably mounted in a plurality of pillow block bearings 58 (FIGS. 3 and 8) on the bottom wall 20 of the casing 18. One end of each of a plurality of pivot arms 59 is fixedly mounted on each shaft 49 and 51 for rotation therewith. Roller 60 on the other, free ends of the arms 49 engage the bottom of the load supporting bar 24. As shown in FIG. 5 , during rotation of the shafts 49 and 51 in one direction, the arms 59 move from a lower or down position to an elevated position. When the arms 59 are in the lower position, the top surfaces 25 of the bars 24 are flush with the top surface of the top wall 19 of the casing 18. When the arms 59 are at their upper limits of travel the top surfaces 25 of the bars 24 are in the elevated, load supporting positions shown in phantom outline in FIG. 2.

Figure 7:
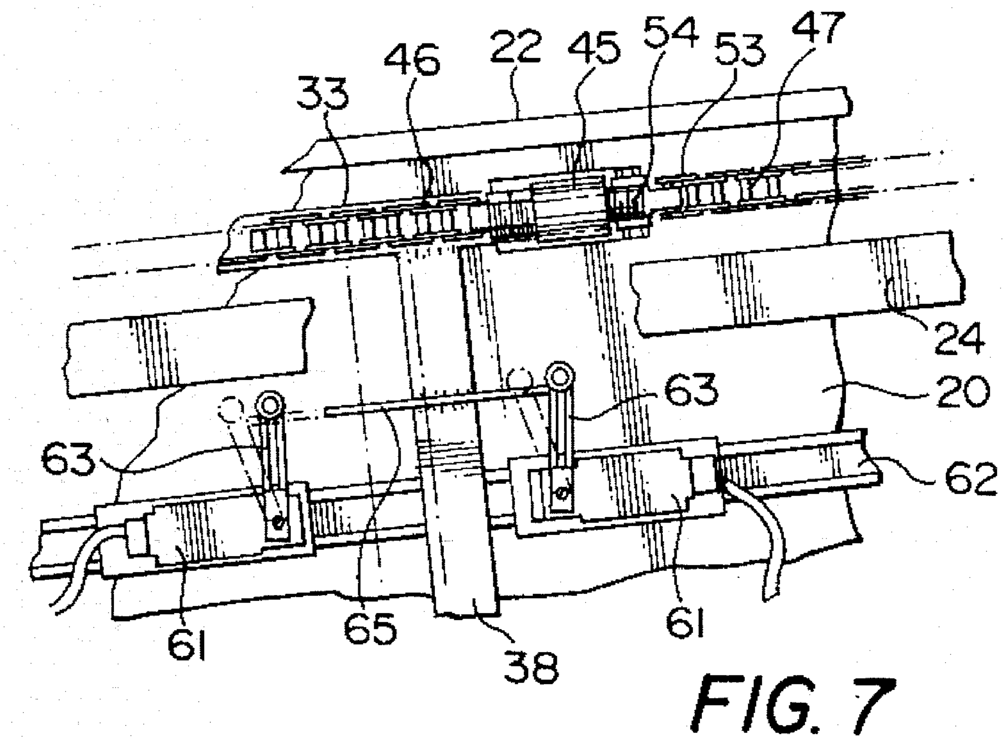
FIG. 7 is a top view of a switch portion of the drive mechanism of FIG. 5.

With reference to FIGS. 4 and 7, the limits of travel of the arms 59 are determined by a pair of microswitches 61 mounted on a strip 62 on the bottom wall 20 of the casing 18. Pivot arms 63 extend outwardly from the switches 61 into the path of travel of a plate 65 mounted on the crossbar 38. As the bars 24 move between the lower and upper positions, the plate 65 moves horizontally with the slide 33 and the crossbar 38 to close one switch 61. Closing of a switch 61 causes closing of a solenoid valve 66 (FIG. 10) to interrupt the flow of hydraulic fluid to one end of each cylinder 28 and 29. Thus, movement of the piston rods 31 and 36, and consequently rotation of the shafts 49 and 51 and the arms 59 ceases.

The rollers 60 ride on the horizontal arm 67 of L-shaped braces 68 on the bottom of each end of the load supporting bars 24. Plates 69 (FIGS. 3 and 5) on the ends of the bars 24 abut the ends of the slots in the top plate 19 when the bars 24 are in the elevated position. The vertical arms 70 of the braces 68 are connected to a crossbar 71 extending substantially the entire length of the casing 18 for interconnecting all of the bars 24. The crossbars 71 ensure that the load supporting bars 24 move in unison. Vertical movement of the crossbars 71 and consequently of the load supporting bars 24 is stabilized by V-rollers 73 mounted in brackets 74 on the crossbars 71 for riding on inclined V-shaped tracks 76. The tracks 76 are supported by gussets 77 extending between the rear of the tracks and the bottom wall 20 of the casing 18. The tracks 76 are inclined because the crossbar 71 moves at an angle to the vertical during vertical movement of the bars 24. Another roller 78 mounted in the bifurcated upper end of a post 79 bears against the crossbar 71 when the latter is in the down position, i.e. the roller 78 limits downward movement of the load supporting bars 24.

Figure 10:
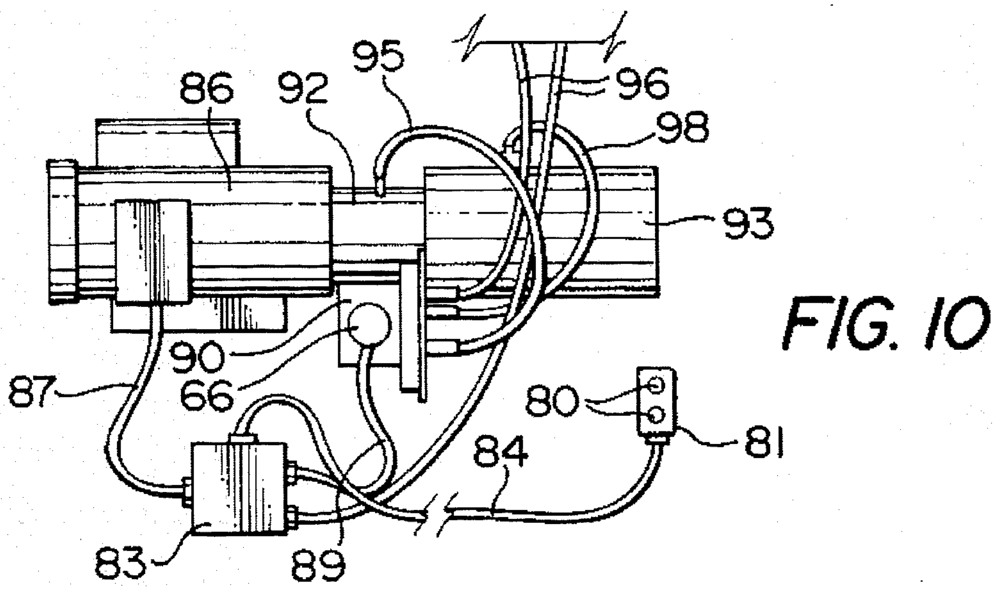
FIG. 10 is a top view of motor and control elements used with the drive mechanism of FIG. 5.

Referring to FIG. 10, operation of the apparatus described above is controlled using the push buttons 80 of a switch 81. The switch 81 is connected to a control box 83 by a wire 84. The box 83 contains a control circuit (not shown), which is connected to an electric motor 86 by a wire 87, and to the solenoid valve 66 by wire 89. The solenoid valve 66 is connected to a manifold 90. The motor 86 operates a hydraulic pump 92 to pump fluid from a reservoir 93. The solenoid valve 66 controls the flow of hydraulic fluid from the pump 92 via line 95 to the manifold 90, and via lines 96 to the cylinders 28 and 29. Hydraulic fluid returning from one end of the cylinders 28 and 29 is fed via the other line 96, the manifold 90 and a line 98 to the reservoir 93. Depending on the direction of flow of hydraulic fluid, i.e. the side of the cylinder 28 and 29 receiving or discharging fluid, the piston rods 31 and 36 are caused to extend or retract. Such movement of the piston rods 31 and 36 is accompanied by movement of the chain 47 and rotation of the shafts 49 and 51 to raise or lower the arms 59 and consequently the support bars 24. When the plate 65 close one of the switches 61, the motor 86 stops, usually with the support bars 24 in the fully raised or lowered position. When the other push button 80 is depressed, the motor 86 is again actuated. Hydraulic fluid is pumped from the reservoir 93 to the one end of each of the cylinders 28 and 29, and returned to the reservoir 93 from the other end of each cylinder. Thus, the chain 47 is caused to move in the opposite direction and the support bars 24 are moved from the upper to the lower position or vice versa.

While it has been indicated that the assembly is used with a modified fork structure on a forklift truck, it will be appreciated that with some flat articles of sufficient stiffness, an ordinary forklift truck can be used to load and unload the pallet assembly. Moreover, the number of support bars can be varied depending upon the nature of the load which the assembly is intended to carry.

We claim:

1. A pallet assembly for use as a load supporting floor on a vehicle comprising casing means for mounting on the vehicle, said casing means including bottom wall means, side wall means, end wall means and cover means extending between said side and end wall means, said cover means defining a continuous load supporting surface on said casing means; a plurality of parallel slot means in said cover means; a plurality of support bar means vertically slidable in said slot means for movement between a lower position flush with said load supporting surface and an elevated position in which the load is supported by said support bar means above and spaced apart from said load supporting surface; and elevating means for simultaneously moving all said support bar means between said lower position in which any load is supported simultaneously by said cover means and said support bar means, and the elevated position in which the load is supported by said support bar means only; whereby forks of a fork lift can be inserted between the bars for depositing a load or on lifting the load from said support bar means.

2. A pallet assembly according to claim 1, wherein said elevating means includes shaft means beneath each end of said support bar means; a plurality of arm means on said shaft means for engaging all said support bar means simultaneously to move said support bar means between the lower and elevated positions; and drive means for simultaneously rotating each said shaft means.

3. A pallet assembly according to claim 2, wherein said elevating means includes crossbar means extending between and interconnecting said support bar means for ensuring simultaneously movement of said support bar means between the lower and elevated positions.

4. A pallet assembly according to claim 3, including track means in said casing means for guiding said crossbar means during movement between said lower and elevated positions.

5. A pallet assembly according to claim 4, wherein said track means includes inclined post means in said casing means, and roller means on said crossbar means for engaging said post means during vertical movement of said crossbar means.

6. A pallet assembly according to claim 2, wherein said drive means includes toothed wheel means on each said shaft means; chain means extending around said toothed wheel means for rotating said toothed wheel means and said shaft means; hydraulic cylinder means in said casing means; piston rod means extending out of said cylinder means; and slide means connecting said piston rod means to said chain means for driving said chain means around said toothed wheel means.

7. A pallet assembly according to claim 6 wherein said hydraulic cylinder and piston rod means include a pair of hydraulic cylinders and piston rods proximate each end of said casing means; and connector bar means connecting each said piston rod to said slide means, whereby all said support bar means move in unison.

* * * * *